(12) United States Patent
Zhao et al.

(10) Patent No.: US 12,546,284 B2
(45) Date of Patent: Feb. 10, 2026

(54) BLADE NOISE REDUCTION DEVICE, BLADE, AND WIND TURBINE GENERATOR SET

(71) Applicant: JIANGSU GOLDWIND SCIENCE & TECHNOLOGY CO., LTD., Jiangsu (CN)

(72) Inventors: Xiong Zhao, Jiangsu (CN); Shaohong Jia, Jiangsu (CN); Qiuge Liu, Jiangsu (CN); Zhuang Hao, Jiangsu (CN)

(73) Assignee: JIANGSU GOLDWIND SCIENCE & TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/553,074

(22) PCT Filed: Sep. 28, 2021

(86) PCT No.: PCT/CN2021/121323
§ 371 (c)(1),
(2) Date: Sep. 28, 2023

(87) PCT Pub. No.: WO2022/205817
PCT Pub. Date: Oct. 6, 2022

(65) Prior Publication Data
US 2024/0183331 A1    Jun. 6, 2024

(30) Foreign Application Priority Data
Mar. 31, 2021    (CN) .................. 202110350190.X (51) Int. Cl.
*F03D 1/06*    (2006.01)
(52) U.S. Cl.
CPC ...... *F03D 1/0645* (2023.08); *F05B 2240/304* (2020.08); *F05B 2260/96* (2013.01)

(58) Field of Classification Search
CPC .. F03D 1/0675; F03D 1/06495; F03D 1/0687; F03D 1/0688; F05B 2240/304; F05B 2260/96
See application file for complete search history.

(56) References Cited

U.S. PATENT DOCUMENTS 5,533,865 A * 7/1996 Dassen ................. F03D 1/0608
                                                244/200.1
8,460,779 B2 * 6/2013 Gupta .................... F15D 1/004
                                                428/167
(Continued)

FOREIGN PATENT DOCUMENTS

CN    104791199 A *  7/2015
CN    105804955 A    7/2016
(Continued)

OTHER PUBLICATIONS

The First Chinese Office Action dated Feb. 11, 2022; Appln. No. 202110350190.X.
(Continued)

*Primary Examiner* — Nathaniel E Wiehe
*Assistant Examiner* — Maxime M Adjagbe
(74) *Attorney, Agent, or Firm* — Frank Gao, Esq.

(57) ABSTRACT

A blade noise reduction device, comprising a plurality of sawtooth units. The plurality of sawtooth units are arranged in a first direction. Each sawtooth unit comprises secondary teeth and a primary tooth, which extend in a second direction, wherein at least one secondary tooth is distributed on each of two sides of the primary tooth, the tooth vertex angle of the secondary tooth being smaller than the tooth vertex angle of the primary tooth. The blade noise reduction device can remarkably improve the noise reduction effect. In addi- (Continued)

tion, the present invention further relates to a blade having the blade noise reduction device, and a wind turbine generator set having the blade.

18 Claims, 5 Drawing Sheets

(56) References Cited

U.S. PATENT DOCUMENTS

| | | |
|---|---|---|
| 2011/0223030 A1 | 9/2011 | Huck et al. |
| 2013/0170999 A1 | 7/2013 | Vassilicos |
| 2013/0280085 A1* | 10/2013 | Koegler ............... F03D 1/0633 416/228 |
| 2014/0377077 A1 | 12/2014 | Gruber et al. |
| 2015/0078910 A1* | 3/2015 | Oerlemans ........... F03D 1/0641 29/889.1 |
| 2015/0078913 A1* | 3/2015 | Enevoldsen .......... F03D 1/0658 29/889.7 |
| 2015/0247487 A1* | 9/2015 | Oerlemans ............... F03D 9/25 416/228 |
| 2018/0057141 A1 | 3/2018 | Shormann |
| 2022/0163012 A1* | 5/2022 | León .................... F03D 1/0675 |

FOREIGN PATENT DOCUMENTS

| | | |
|---|---|---|
| CN | 110685870 A | 1/2020 |
| CN | 113294286 A | 8/2021 |
| EP | 3 348 826 A1 | 7/2018 |
| EP | 3 696 402 A1 | 8/2020 |
| GB | 2497739 A | 6/2013 |
| WO | 2020/104781 A1 | 5/2020 |

OTHER PUBLICATIONS

The Second Chinese Office Action dated Aug. 16, 2022; Appln. No. 202110350190.X.
The International Search Report mailed Jan. 5, 2022; PCT/CN2021/121323.
Carlos Arce Le, et al.: "Flow topology and acoustic emissions of trailing edge serrations at incidence", Exp Fluids: (2016) 57:91; 17 pages.
The Extended European Search Report dated Jul. 10, 2024; Appln. No. 21934454.6.
The First Canadian Office Action dated Feb. 20, 2025; Appln. No. 3,213,485.
Australian Examination Report No. 3; dated Jun. 3, 2025; Appln. No. 2021437691.

* cited by examiner

BLADE NOISE REDUCTION DEVICE, BLADE, AND WIND TURBINE GENERATOR SET

CROSS-REFERENCE TO RELATED APPLICATIONS

This application is a National Stage of International Application No. PCT/CN2021/121323, filed on Sep. 28, 2021, which claims priority to Chinese Patent Application No. 202110350190.X, filed on Mar. 31, 2021, both of which are hereby incorporated by reference in their entireties.

TECHNICAL FIELD

The present disclosure relates to a technical field of wind power generation, in particular to a blade noise reduction device, a blade and a wind turbine generator set.

BACKGROUND

As a single-unit capacity of a wind turbine generator set increases, a blade is required to be longer and longer. As a result, a radiated noise of the blade is also increasing. For large-megawatt wind generator set, the noise mainly comes from an aerodynamic noise of the blade, especially noise from a turbulent boundary layer at a trailing edge.

Therefore, it is particularly important to develop noise reduction accessories with significant noise reduction effect. A sawtooth trailing edge (a flat triangular sawtooth trailing edge) is the most widely used noise reduction accessory for the blade. However, a research result shows that the noise reduction effect of the flat triangular sawtooth is not ideal, the reduction is very limited (generally 0-2 dBA), bounces arises at high wind speeds, and the noise is even higher than that without the flat triangle sawtooth.

SUMMARY

Therefore, an object of the present disclosure is to provide a blade noise reduction device, a blade and a wind turbine generator set capable of significantly reducing noise.

According to an aspect of the present disclosure, a blade noise reduction device is provided. The blade noise reduction device includes: a plurality of sawtooth units arranged along a first direction, wherein each sawtooth unit comprises a primary tooth and secondary teeth extending along a second direction, and at least one secondary tooth is distributed on each of two sides of the primary tooth, wherein an addendum angle of the secondary tooth is smaller than an addendum angle of the primary tooth.

According to another aspect of the present disclosure, a blade is provided. The blade includes the afore-mentioned blade noise reduction device.

According to another aspect of the present disclosure, a wind power generator set is provided. The wind power generator set includes the afore-mentioned blade noise reduction device.

As described above, according to an embodiment of the present disclosure, the secondary teeth are formed on two sides of the primary tooth, to improve the noise reduction effect.

According to embodiments of the present disclosure, the addendum angle of the secondary teeth is smaller than the addendum angle of the primary tooth, to help to guide an eddy current in the air, achieve a better noise reduction effect, and at the same time, ensure a rigidity of the primary tooth.

According to the embodiments of the present disclosure, the noise reduction effect can be further improved by a greater length of the secondary teeth, an improved curved surface design of the pressure surface of the sawtooth unit, and a guide rib. The noise reduction effect is still significant at high wind speeds.

BRIEF DESCRIPTION OF THE DRAWINGS

The above and other objects and features of the present disclosure will become more apparent from the following description of embodiments in conjunction with accompanying drawings, in which.

Description of reference number: 100—connection body, 110—joint area, 120—trailing edge step, 130—extension section, 200—sawtooth unit, 210—primary tooth, 211 and 212—sides of primary tooth, 220—secondary tooth, 221 and 222—outer and inner sides of secondary tooth 220, $\alpha 1$—addendum angle of primary tooth, $\alpha 2$—addendum angle of secondary tooth, H—height of primary tooth, W—width of primary tooth, 300—guide rib, 310—leading edge transition section, 320—trailing edge transition section, 330—equal-height section, S1—suction surface of blade noise reduction device, S2—pressure surface of blade noise reduction device, PS—pressure surface of blade, SS—suction surface of blade, 1—blade, 1a—trailing edge step of blade, D1—first direction, D2—second direction.

DETAILED DESCRIPTION

Embodiments of the present disclosure will now be described in detail with reference to accompanying drawings, examples of which are illustrated in the accompanying drawings, wherein the same reference sign always refers to the same component.

Figure 1:
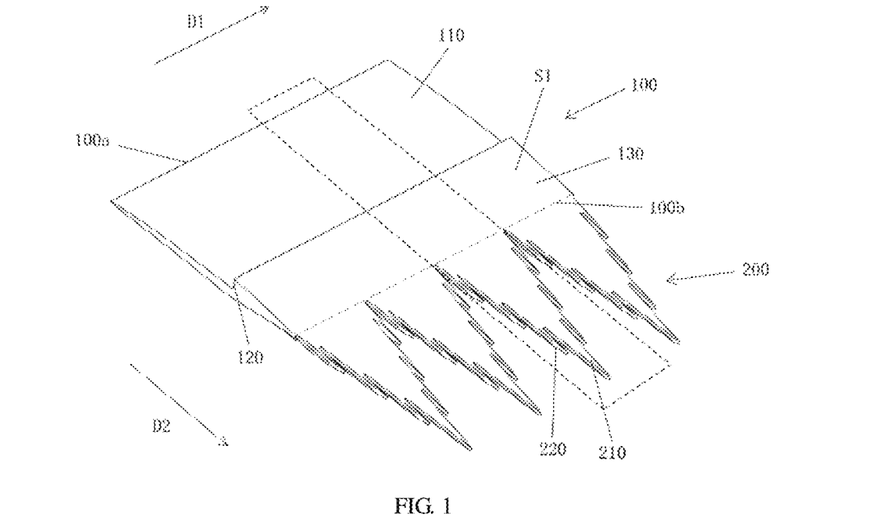
FIG. 1 is a schematic diagram of a suction surface of a blade noise reduction device according to a first embodiment of the present disclosure.
Figure 2:
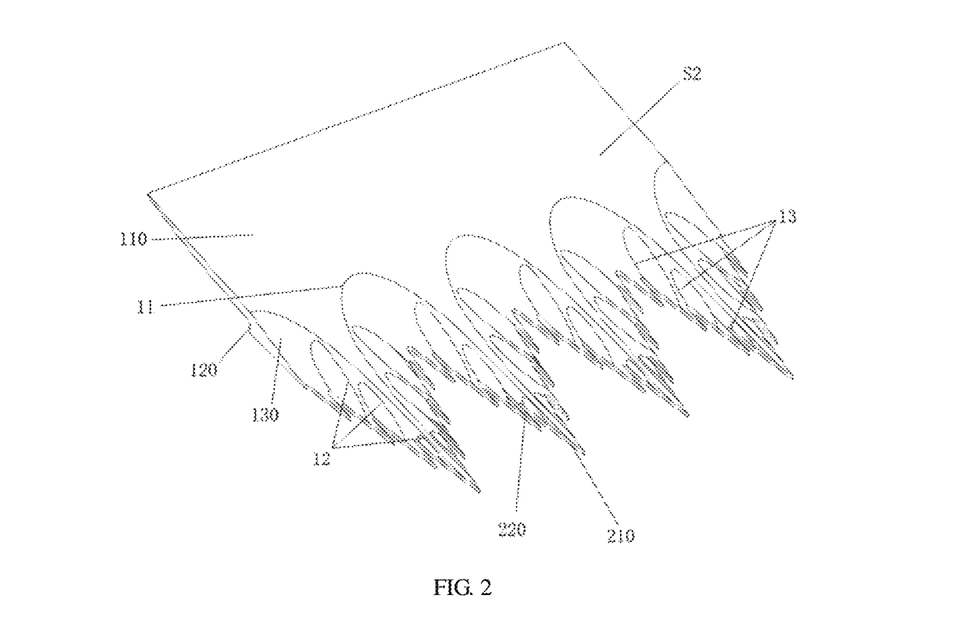
FIG. 2 is a schematic diagram of a pressure surface of a blade noise reduction device according to a first embodiment of the present disclosure.
Figure 3:
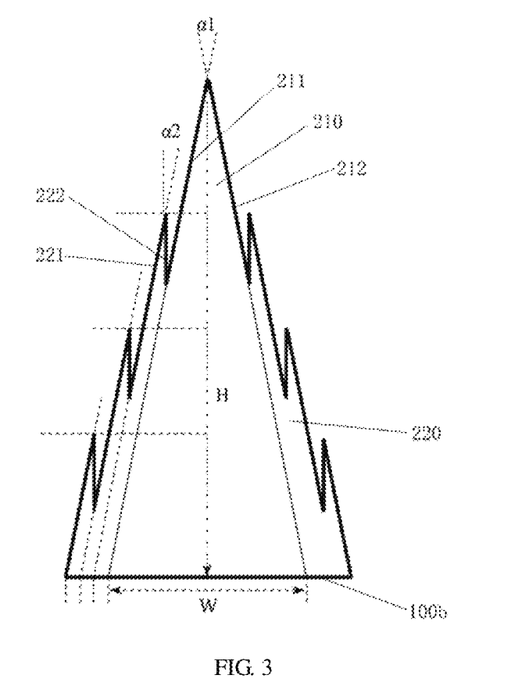
FIG. 3 is a schematic plan diagram of a suction surface of one sawtooth unit according to one embodiment of the present disclosure.
Figure 4:
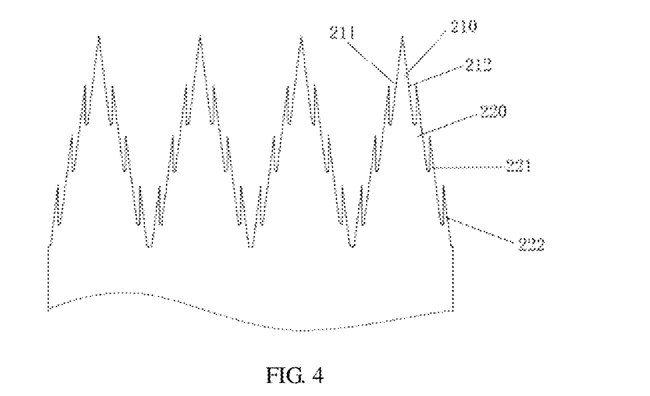
FIG. 4 is a schematic plan diagram of a suction surface of a plurality of sawtooth units of the blade noise reduction device of FIG. 1.

FIG. 1 is a schematic diagram of a suction surface of a blade noise reduction device according to a first embodiment of the present disclosure. FIG. 2 is a schematic diagram of a pressure surface of a blade noise reduction device according to a first embodiment of the present disclosure. FIG. 3 is a schematic plan diagram of a suction surface of one sawtooth unit according to one embodiment of the present disclosure. FIG. 4 is a schematic plan diagram of a suction surface of a plurality of sawtooth units of the blade noise reduction device of FIG. 1.

For ease of description, a first direction D1, a second direction D2, a suction surface S1 and a pressure surface S2 of a blade noise reduction device will be defined. It should be understood that when the blade noise reduction device according to the present disclosure is installed on a trailing edge of a blade, the first direction D1 may correspond to a span direction of the blade, and the second direction D2 may correspond to a chord direction of the blade, the suction surface S1 of the blade noise reduction device may correspond to the suction surface SS of the blade, and the pressure surface S2 of the blade noise reduction device may correspond to the pressure surface PS of the blade.

As shown in FIG. 1, the blade noise reduction device according to embodiments of the present disclosure includes: a plurality of sawtooth units 200 arranged along the first direction D1. Each sawtooth unit 200 includes a primary tooth 210 and secondary teeth 220 extending along the second direction D2. At least one secondary tooth 220 is distributed at each of two sides of the primary tooth 210. An addendum angle $\alpha 2$ of the secondary tooth 220 is smaller than an addendum angle $\alpha 1$ of the primary tooth 210. The addendum angle $\alpha 2$ of the secondary tooth 220 is set to be smaller than the addendum angle $\alpha 1$ of the primary tooth 210, to increase an effective length of an interaction between two sides of the secondary tooth 220 and an incoming flow, so that a favorable vortex system with stronger energy is generated after mixing with the incoming flow. It enhances a decay rate of wake turbulence pulsation and accelerates a flow mixing and energy diffusion of the wake. It can widen the flow wake and accelerate breaking of large eddies in the incoming flow, which is beneficial to noise reduction. Compared to a customary sawtooth, on the basis of widening the wake, it can achieve a smaller wake loss, which is more advantageous in terms of a noise reduction level and aerodynamic performance.

According to embodiments of the present disclosure, the blade noise reduction device may include a connection body 100. A length of the connection body 100 in the first direction D1 may be the same as the length of the plurality of sawtooth units 200 in the first direction D1. According to embodiments of the present disclosure, the length of the connection body 100 and the plurality of sawtooth units 200 in the first direction D1 (i.e., the length of the blade noise reduction device) may be 30%-40% of the length of the blade.

According to embodiments of the present disclosure, as shown in FIG. 1, the connection body 100 may have a first side 100*a* and a second side 100*b* opposite to each other in the second direction D2. The connection body 100 may include a joint area 110 and a trailing edge step 120. The trailing edge step 120 protrudes relative to the joint area 110 on the suction surface S1 of the blade noise reduction device, and is disposed at an end of the joint area 110 close to the sawtooth unit 200.

According to embodiments of the present disclosure, the joint area 110 may be an area that is joined (e.g., glued to) and coincident with a trailing edge area of the blade. As described later with reference to FIG. 9, the joint area 110 on the suction surface S1 may be joined and overlap with the pressure surface PS of the trailing edge area of the blade 1 (as shown in FIG. 9), and the trailing edge step 120 of the connection body 100 corresponds to the trailing edge step 1*a* of the blade 1.

According to embodiments of the present disclosure, the joint area 110 may be an arc surface, so as to be attached well with the trailing edge area 1*a* of the blade 1. According to embodiments of the present disclosure, a length of the joint area 110 in the second direction D2 is 50 mm-100 mm. When the length of the joint area 110 is less than 50 mm, a joint strength may not be guaranteed, and when the length of the joint area is greater than 100 mm, a weight may increase. Preferably, the length of the joint area 110 may be 60 mm-80 mm (e.g., 70 mm).

According to embodiments of the present disclosure, the surface of the joint area 110 on the suction surface S1 may be any one of a smooth surface, a frosted surface, a surface distributed with a groove (e.g., a checkerboard surface), or a combination thereof. When the surface of the joint area 110 on the suction surface S1 is the frosted surface or the surface distributed with a groove, the joint area (e.g., bonding area) can be increased, thereby providing stronger bonding strength.

Figure 8:
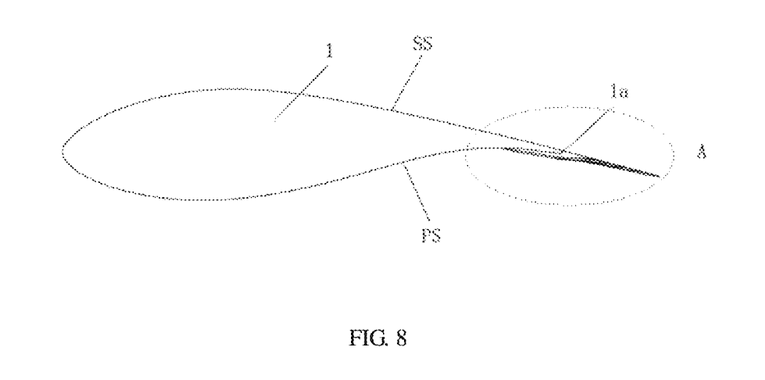
FIG. 8 is a schematic diagram of a blade noise reduction device in an installed state on a trailing edge of a blade according to embodiments of the present disclosure.
Figure 9:
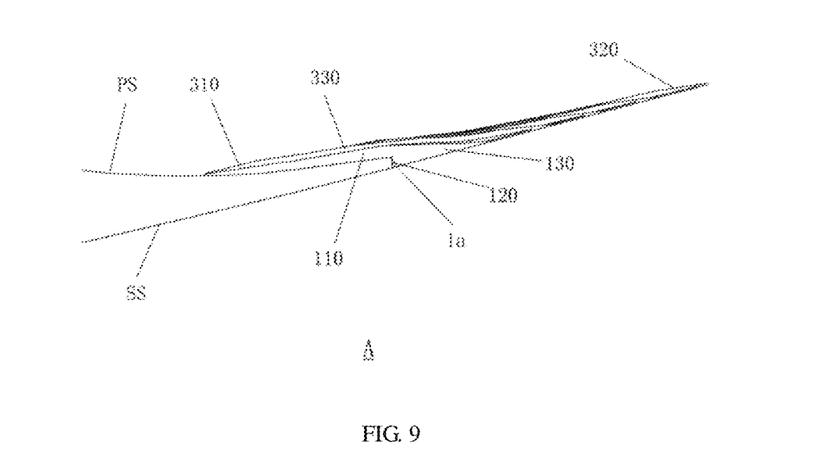
FIG. 9 is an enlarged diagram of part A in FIG. 8.

According to embodiments of the present disclosure, the trailing edge step 120 is adapted to be attached with the trailing edge step 1*a* of the blade 1 (as shown in FIGS. 8 and 9). The trailing edge step 120 may have the same thickness as the trailing edge step 1*a* of the blade 1, so that the suction surface S1 of the blade noise reduction device and the suction surface SS of the blade 1 are well connected.

According to embodiments of the present disclosure, the connection body 100 may further include an extension section 130 disposed between the joint area 110 and the sawtooth unit 200. In a configuration where the extension section 130 is provided, the trailing edge step 120 may be provided between the joint area 110 and the extension section 130.

According to embodiments of the present disclosure, the thickness of the extension section 130 gradually decreases along the second direction D2. In addition, in the second direction D2, the length of the extension section 130 is greater than 0 mm and less than or equal to 100 mm, preferably 20 mm-40 mm (e.g., 30 mm). With the extension section 130 provided, on the one hand, a transition length can be increased, so that an overall thickness of the sawtooth unit 200 can be controlled at a relatively thin level, and on the other hand, a requirement that a total length of the extension section 130 and the sawtooth unit 130 in the second direction D2 is 10%-20% of a chord length of the blade at this position (when this range is satisfied, the blade noise reduction device can achieve a better noise reduction effect) can be met. When the requirement that the length of the sawtooth unit 130 in the second direction D2 is 10%-20% of the chord length of the blade at this position is met, the extension section 130 may not be provided.

According to embodiments of the present disclosure, the plurality of sawtooth units 200 may be disposed on the second side 100*b* of the connection body 100, and tooth roots of the sawtooth units 200 may be located on the second side 100*b* of the connection body 100. The plurality of sawtooth units 200 may be arranged along the first direction D1. An embodiment in which four sawtooth units 200 are arranged is shown in FIG. 1. However, the present disclosure is not limited thereto; for example, five, six, or more than six sawtooth units 200 may be provided. That is, the number of the sawtooth units 200 may be determined according to the length of a single sawtooth units 200 in the first direction D1 and the length of the connection body 100 in the first direction D1. Therefore, the sum of the lengths of the plurality of sawtooth units 200 in the first direction D1 may be equal to the length of the connection body 100 in the first direction D1.

According to embodiments of the present disclosure, each sawtooth unit 200 may include a primary tooth 210 and secondary teeth 220. The primary tooth 210 and the secondary teeth 220 extend along the second direction D2. At least one secondary tooth 220 may be distributed on each of two sides of the primary teeth 210. Although three secondary teeth 220 distributed on each side of the primary tooth 210 are shown in the embodiment of FIG. 1, the present disclosure is not limited thereto; for example, there may be one, two, three, four or more secondary teeth 220 on each side of the primary tooth 210. In addition, although that the secondary teeth 220 are formed at symmetrical positions on two sides of the primary tooth 210 are shown in the embodiment of FIG. 1, the present disclosure is not limited thereto; for example, the secondary teeth 220 on two sides of the primary tooth 210 may be provided asymmetrically, and the numbers thereof can also be different.

According to embodiments of the present disclosure, with the secondary teeth 220 formed on two sides of the primary tooth 210, the noise reduction effect can be improved. Specifically, when an airflow blows against the blade, the airflow and the blade interact to form a turbulent flow along the surface of the blade. The turbulent flow scatters sound at a trailing edge, forming an effective sound source, and the greater the turbulence intensity, the greater the noise. With the sawtooth formed on the trailing edge of the blade, the turbulent flow across the surface of the blade forms counter-rotating vortex pairs as it passes the sawtooth, thereby reducing the intensity of the turbulent flow. According to embodiments of the present disclosure, via the at least one secondary tooth formed on each of the two sides of the primary tooth, the number of sawtooth per unit width can be increased, so that the turbulent flow can form a plurality of counter-rotating vortex pairs within the range of the sawtooth unit 200. Mutual counteraction of multiple counter-rotating vortex pairs can greatly reduce the intensity of turbulence, thereby improving the noise reduction effect.

As shown in FIG. 3, the primary tooth 210 may have sides 211 and 212, and the sides 211 and 212 may form an addendum angle $\alpha1$. The addendum angle of the primary tooth 210 may be greater than or equal to 11.4° and less than or equal to 53.1°. When the addendum angle of the primary tooth 210 is less than 11.4°, a rigidity of the primary tooth 210 may not be guaranteed. When the addendum angle of the primary tooth 210 is greater than 53.10, the noise reduction effect may be reduced.

According to embodiments of the present disclosure, two intersection points are formed between extension lines of the two sides 211 and 212 of the primary tooth 210 and a tooth root of the sawtooth unit (i.e., the second side 100b of the connection body 100). A distance between the two intersection points is defined as the width W of the primary tooth 210. According to embodiments of the present disclosure, a triangle, preferably an isosceles triangle, may be formed by the two sides 211 and 212 and the tooth root of the primary tooth 210. A distance from the addendum angle $\alpha1$ to the tooth root of the primary tooth 210 (i.e., the distance of an axis of the triangle formed by the two sides 211 and 212 and the tooth root of the primary tooth 210) is defined as a height H of the primary tooth 210.

According to embodiments of the present disclosure, a ratio H/W of the height H and the width W of the primary tooth 210 satisfies $1 \leq H/W \leq 10$. However, when H/W>10, the rigidity of the primary tooth 210 may not be guaranteed. And when H/W≤1, an aspect ratio is too small. When the ratio H/W of the height H to the width W of the primary tooth 210 satisfies $1 \leq H/W \leq 10$, a larger aspect ratio can be achieved, and the rigidity of the primary tooth 210 can be satisfied.

According to embodiments of the present disclosure, as shown in FIG. 3, the secondary teeth 220 may be distributed on two sides of the primary tooth 210, and each has an outer side 221 away from the primary tooth 210 and an inner side 222 close to the primary tooth 210. The outer side 221 and the inner side 222 of the 220 of each secondary tooth 220 may define addendum angle $\alpha2$. According to embodiments of the present disclosure, the addendum angle $\alpha2$ of the secondary tooth 220 may be smaller than the addendum angle $\alpha1$ of the primary tooth 210. Therefore, the secondary tooth 220 can be formed to be sharper than the primary tooth 210, thereby helping to guide eddy currents in the air and achieving a better noise reduction effect. In addition, by reducing the addendum angle $\alpha2$ of the secondary teeth 220, the addendum angle $\alpha1$ of the primary tooth 210 is not excessively reduced, thereby ensuring the rigidity of the primary tooth 210.

According to embodiments of the present disclosure, a length of the outer side 221 may be greater than a length of the inner side 222 of the secondary tooth 220. In addition, in the example of FIG. 3, lengths of the outer sides 221 of respective secondary teeth 220 are equal to each other and lengths of the inner sides 222 of respective secondary teeth 220 are equal to each other. However, the present disclosure is not limited thereto. For example, the lengths of the outer sides 221 of the respective secondary teeth 220 may be different from each other and/or the lengths of the inner sides 222 of the respective secondary teeth 220 may be different from each other. Optionally, the length of each of the outer side 221 and the inner side 222 of the secondary tooth 220 may be gradually changed. Specifically, from the tooth root of the sawtooth unit 200 to the tooth tip of the primary tooth 210, that is, along the second direction D2, the length of the outer side 221 of respective secondary tooth 220 may be gradually increased, and the length of the inner side 222 of respective secondary tooth 220 may be gradually increased. That is, the lengths of the outer side 221 and the inner side 222 of the secondary tooth 220 closest to the tooth root are the shortest, and the lengths of the outer side 221 and the inner side 222 of the secondary tooth 220 closest to the tooth tip are the longest.

According to embodiments of the present disclosure, as shown in FIG. 3, taking a left secondary tooth as an example, an intersection point is formed between the extension line of the outer side 221 and the tooth root of each secondary tooth 220, and an intersection point is formed between the side 211 of the primary tooth 210 and the tooth root. Optionally, distances between adjacent intersection points are equal. In addition, a right secondary tooth may also be provided similarly to the left secondary tooth. However, the above example is only one specific embodiment of the present disclosure. According to another embodiment of the present disclosure, the distances between adjacent intersection points may also be unequal.

In addition, according to embodiments of the present disclosure, as shown in FIG. 3, a projection of the tooth tips of the secondary teeth 220 on the axis of the primary tooth 210 may equally divide the axis of the primary tooth 210. However, the present disclosure is not limited thereto.

In addition, in the embodiment of FIG. 3, the outer sides 221 of the secondary teeth 220 are parallel to the side 211 of the primary tooth 210, and the inner sides 222 of the secondary teeth 220 are perpendicular to the tooth root of the sawtooth unit 200. However, the present disclosure is not limited thereto.

According to embodiments of the present disclosure, as shown in FIG. 1, on the suction surface S1, the sawtooth unit 200 is in a shape of a plane, and as shown in FIG. 2, on the pressure surface S2, the sawtooth unit 200 is in a shape of a continuous curved surface.

Specifically, as shown in FIG. 2, on the pressure surface S2, an intersecting surface 11 between adjacent primary teeth 210 is provided as an arc-shaped surface, an intersecting surface 12 between adjacent primary tooth 210 and secondary tooth 220 is provided as an arc-shaped surface, and an intersecting surface 13 between adjacent secondary teeth 220 is provided as an arc-shaped surface. With such a configuration, stress concentration can be avoided on a premise of ensuring a structural strength of the primary tooth 210 and the secondary tooth 220. In addition, the thickness of the entire sawtooth unit 200 can be reduced as much as possible, and a resistance and extra noise brought by the blade noise reduction device can be reduced.

In addition, according to embodiments of the present disclosure, on the pressure surface S2, the thickness of the primary tooth 210 is gradually decreased from the axis of the primary tooth 210 to the sides of the primary tooth 210. That is, the thickness of the primary tooth 210 at the axis is the largest, and a smooth transition is provided and the thickness is gradually decreased from the axis of the primary tooth 210 to the side edges 211 and 212 of the primary tooth 210. In addition, on the pressure surface S2, the thickness of the secondary tooth 220 is gradually decreased from the axis of the secondary tooth 220 to the sides (outer side 221 and inner side 222) of the secondary teeth 220. That is to say, the thickness of the secondary tooth 220 at the axis is the largest, a smooth transition is provided and the thickness is gradually decreased from the axis of the secondary tooth 220 to the outer side 221 and the inner side 222 of the secondary tooth 220. According to the embodiment of the present disclosure, with the above structure, the thickness of the entire sawtooth unit 200 can be reduced as much as possible while the rigidity is guaranteed, the resistance and extra noise brought by the blade noise reduction device can be reduced.

Optionally, the thicknesses of the sides 211 and 212 and the tooth tip of the primary tooth 210 are less than or equal to 1 mm. The thicknesses of the tooth tip and the outer and inner sides 221 and 222 of the secondary tooth 220 can also be less than or equal to 1 mm. Optionally, the thickness of the tooth tip of the secondary tooth 220 may be equal to the thickness of the tooth tip of the primary tooth 210, and the thicknesses of the outer side 221 and the inner side 222 of the secondary tooth 220 may be equal to the thickness of the sides 211 and 212 of the primary tooth 210. Optionally, the thicknesses of the sides 211 and 212 and the tooth tip of the primary tooth 210 may be equal to each other, and the thicknesses of the tooth tip and the outer side 221 and inner side 222 of the secondary tooth 220 may be equal to each other. According to the present disclosure, through the above structure, the thickness of the entire sawtooth unit 200 can be reduced as much as possible, reducing resistance and extra noise.

In addition, according to the embodiment of the present disclosure, as shown in FIG. 4, the intersection of the sides (the outer side 221 and inner side 222) of the secondary tooth 220 is an arc transition, and the intersections of the side (the inner side 222) of the secondary tooth 220 and the sides 211 and 212 of the primary tooth 210 are arc transitions to avoid stress concentration.

Figure 5:
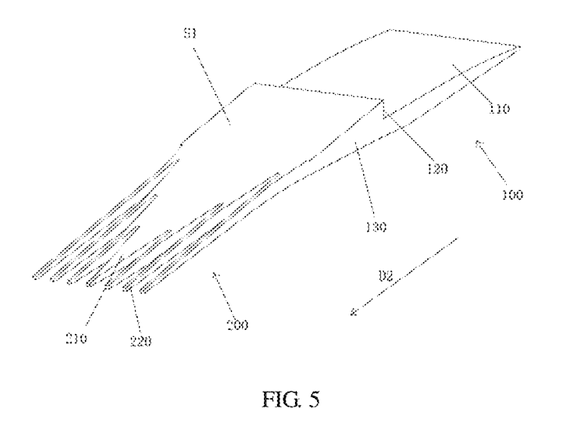
FIG. 5 is a schematic diagram of a suction surface of a blade noise reduction device according to a second embodiment of the present disclosure.

FIG. 5 is a schematic diagram of a suction surface of a blade noise reduction device according to a second embodiment of the present disclosure. Hereinafter, the blade noise reduction device according to a second embodiment of the present disclosure will be described with reference to FIG. 5. To avoid repetitive descriptions, only structures different from those of the blade noise reduction device shown in FIGS. 1 to 4 will be described below.

As shown in FIG. 5, the blade noise reduction device according to the embodiment of the present disclosure is different from the blade noise reduction device shown in FIGS. 1 to 4 in the structure of the secondary tooth 220. As shown in FIG. 5, the secondary tooth 220 may extend to a position aligned with the tip of the primary tooth 210. According to the embodiment of the present disclosure, the length of the secondary teeth 220 is increased to help to guide the eddy current in the air and achieve a better noise reduction effect.

According to embodiments of the present disclosure, the secondary teeth 220 in FIG. 5 may be substantially parallel to each other (may not be completely parallel due to a manufacturing process error of the secondary teeth 220), and parallel to the second direction D2 to better guide the eddy current in the air.

In addition, although the tooth tips of the primary tooth 210 and the secondary teeth 220 shown in FIG. 5 are in a frustum shape, the present disclosure is not limited, and the tooth tips of the primary tooth 210 and the secondary teeth 220 in FIG. 5 may be similar to those in FIG. 2 to form sharp corners.

Figure 6:
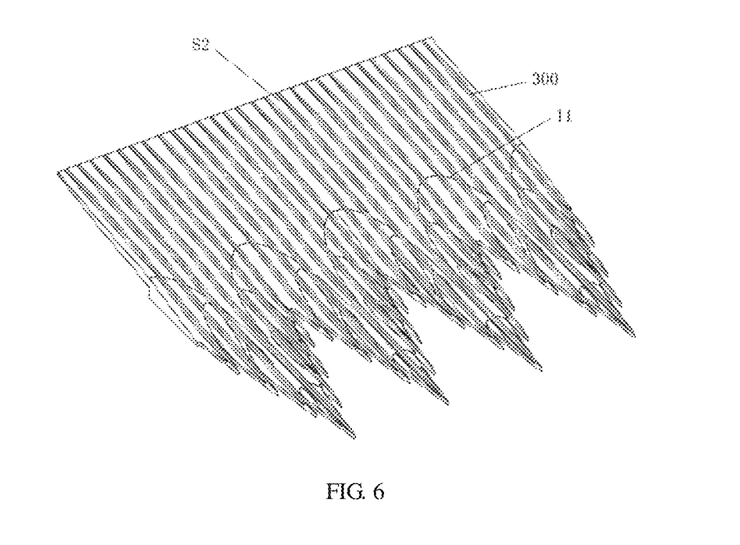
FIG. 6 is a schematic diagram of a pressure surface of a blade noise reduction device according to a third embodiment of the present disclosure.
Figure 7:
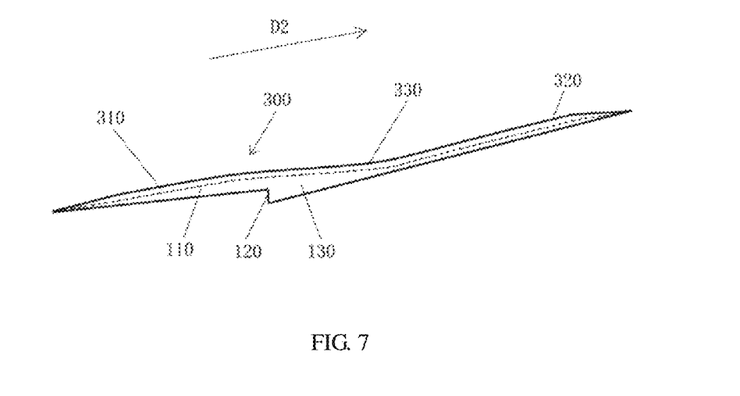
FIG. 7 is a cross-sectional diagram of guide ribs and a sawtooth unit in a combined state according to an embodiment of the present disclosure.

FIG. 6 is a schematic diagram of a pressure surface of a blade noise reduction device according to a third embodiment of the present disclosure. FIG. 7 is a cross-sectional diagram of guide ribs and a sawtooth unit in a combined state according to embodiments of the present disclosure. Hereinafter, a blade noise reduction device according to the third embodiment of the present disclosure will be described with reference to FIGS. 6 and 7. To avoid repetitive descriptions, only structures different from those of the blade noise reduction device shown in FIGS. 1 to 4 will be described below.

As shown in FIGS. 6 and 7, the blade noise reduction device according to the embodiment of the present disclosure may further include a plurality of guide ribs 300. The guide ribs 300 may be disposed on the pressure surface S2 of the blade noise reduction device, and may extend along the second direction D2. According to embodiments of the present disclosure, the guide ribs 300 may extend from the first side 100a of the connection body 100 to the other end of the sawtooth unit 200 that is not in contact with the connection body 100.

According to embodiments of the present disclosure, in the first direction D1, the guide ribs 300 may be respectively disposed at positions corresponding to the tooth tip of the primary tooth 210, the tooth tips of the secondary teeth 220 and a position between adjacent sawtooth units 200. According to embodiments of the present disclosure, a guide rib 300 may also be disposed at a position corresponding to a position between the tooth tips of the secondary teeth 220, and a distance between adjacent guide ribs 300 is between 2 mm-8 mm.

According to embodiments of the present disclosure, the guide ribs 300, the connection body 100 and the sawtooth unit 200 may be integrally formed. A boundary line between the guide ribs 300 and the connection body 100 and the sawtooth unit 200 in FIG. 7 is only a virtual line drawn to distinguish the guide ribs 300 from the connection body 100 and the sawtooth unit 200.

According to embodiments of the present disclosure, along the second direction D2, each guide rib 300 may include a leading edge transition section 310, a trailing edge transition section 320, and an equal-height section 330 connecting the leading edge transition section 310 and the trailing edge transition section 320. According to embodiments of the present disclosure, a length of the leading edge transition section 310 in the second direction D2 may be less than or equal to 20 mm, and a length of the trailing edge transition section 320 in the second direction D2 may be less than or equal to 20 mm. At the leading edge transition section 310, the height of the guide rib 300 is increased from 0 mm to a predetermined height, and at the trailing edge transition section 320, the height of the guide rib 300 is decreased from the predetermined height to 0 mm. According to embodiments of the present disclosure, the predetermined height may be 1 mm-3 mm, preferably 2 mm.

According to embodiments of the present disclosure, a height of the equal-height section 330 may be substantially constant and may be equal to the predetermined height. Specifically, the surface of the equal-height section 330 may be smooth or a small wavy surface or sawtooth surface.

According to embodiments of the present disclosure, the thickness (thickness measured in the first direction D1) of the guide rib 300 is in the range of 1 mm-3 mm, preferably 2 mm.

According to the embodiment of the present disclosure, by the guide ribs 300, the noise reduction effect can be improved. In addition, by the equal-height section 330 provided to connect the leading edge transition section 310 and the trailing edge transition section 320, an effective area with a sufficiently long length having a noise reduction effect can be provided in a case of decreasing the weight of the guide ribs 300 as much as possible and not increasing additional resistance.

In addition, it should be understood that although FIG. 6 shows a case where the guide ribs 300 are applied to the embodiment in FIG. 2, the present disclosure is not limited thereto, for example, the guide ribs 300 can also be similarly applied to the example of FIG. 5.

FIG. 8 is a schematic diagram of a blade noise reduction device in an installed state on a trailing edge of a blade according to embodiments of the present disclosure. FIG. 9 is an enlarged view of part A in FIG. 8. Hereinafter, a blade according to embodiments of the present disclosure will be described with reference to FIGS. 8 and 9.

As shown in FIGS. 8 and 9, the blade 1 according to embodiments of the present disclosure may include a blade noise reduction device. The blade noise reduction device may be the blade noise reduction device according to any of the above embodiments.

Specifically, the blade 1 may have a pressure surface PS and a suction surface SS. When the above-described blade noise reduction device is installed on the blade 1, a joint area 110 on the suction surface S1 may be overlapped and joined (e.g., bond) with the pressure surface PS of a trailing edge area of the blade 1 (as shown in FIG. 9), and a trailing edge step 120 of the connection body 100 corresponds to the trailing edge step 1a of the blade 1.

According to embodiments of the present disclosure, in a chord direction of the blade 1, a length of the blade noise reduction device protruding from the trailing edge of the blade 1 is 10%-20% of a chord length of a cross-sectional airfoil of the blade 1 at this position. When this range is satisfied, an excellent noise reduction effect can be achieved via the blade noise reduction device.

According to embodiments of the present disclosure, the blade noise reduction device is arranged in the range of 0%-40% of the length direction of the blade from a tip of the blade 1.

The embodiment in which the blade noise reduction device includes the connection body 100 and is installed to the blade is described above, but the present disclosure is not limited thereto. The blade noise reduction device according to the embodiment of the present disclosure may also not include the connection body 100. In this case, the tooth root of the sawtooth unit 200 can be fixed to the trailing edge of the blade by bonding, or the tooth root of the sawtooth unit 200 can be fixed to the trailing edge of the blade by inserting, or the sawtooth unit 200 can be formed integrally with the blade. In addition, when the blade noise reduction device does not include the connection body 100, the guide ribs 300 may extend from the tooth root of the sawtooth unit 200 to an end of the sawtooth unit 200 in the second direction D2.

According to another embodiment of the present disclosure, there may be provided a wind turbine generator set comprising any one of the blades described above.

Figure 10:
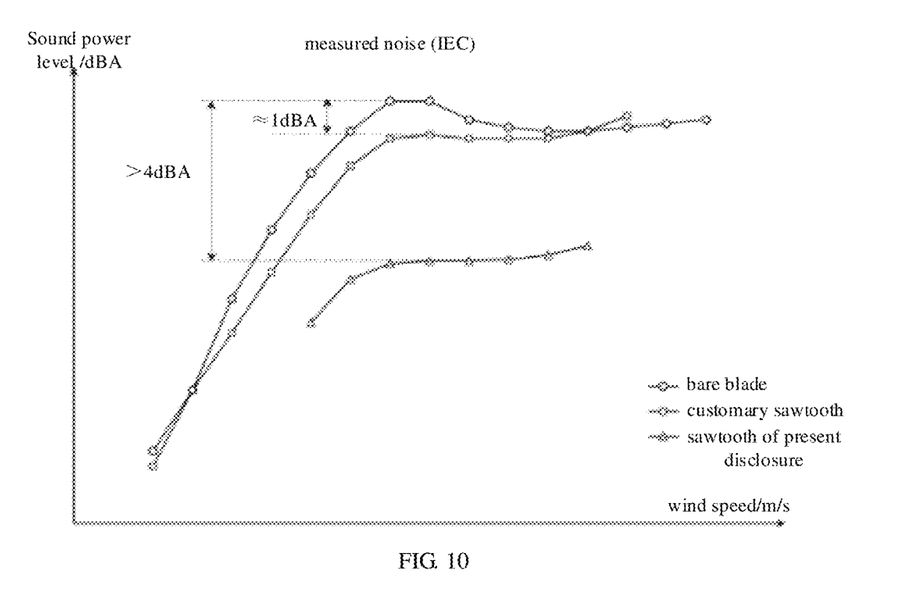
FIG. 10 is a measured noise reduction effect of a wind turbine generator set installed with the blade noise reduction device according to embodiments of the present disclosure.

FIG. 10 is a measured noise reduction effect of a wind turbine generator set installed with a blade noise reduction device according to embodiments of the present disclosure.

The blade noise reduction device according to a third embodiment of the present disclosure is manufactured by using 3D printing technology, and then installed on the blade trailing edge of the wind turbine blade. A comparison of IEC noise test results is made among a wind turbine generator with a bare blade (installed with no any noise reduction device) wind turbines, a wind turbine generator set with a blade installed with customary flat triangular sawtooth, and a wind turbine generator set with a blade installed with the blade noise reduction device according to the embodiment of the present disclosure.

As shown in FIG. 10, it can be concluded that a noise reduction effect of about 1 dBA on the peak sound power level can be achieved via the customary flat triangular sawtooth, and even rebound occurs at high wind speeds, and the noise is higher than that of the wind turbine generator set with the bare blade. A significant noise reduction effect greater than 4 dBA on the peak sound power level via the sawtooth of the present disclosure, a rebound amplitude at high wind speed is small, and the noise reduction effect is more prominent compared with the ordinary sawtooth.

Figure 11:
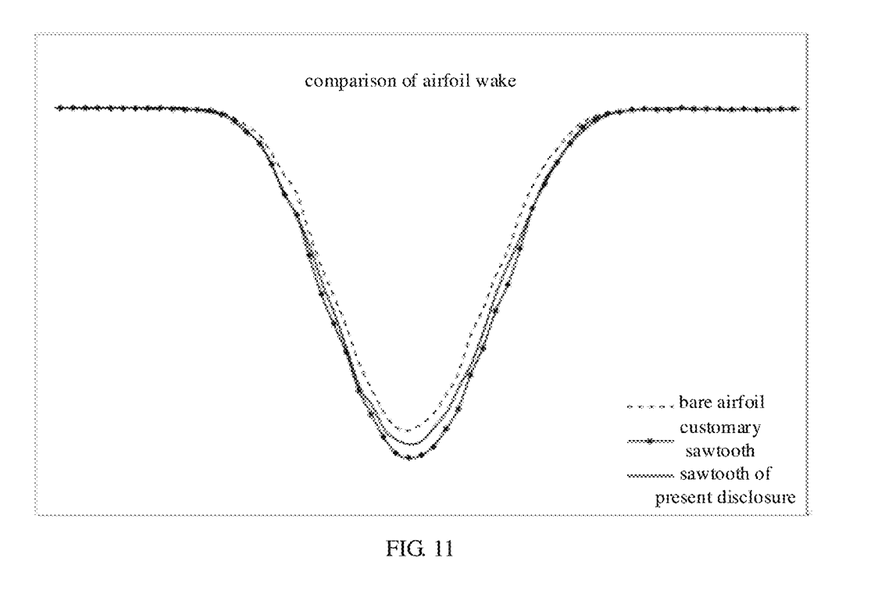
FIG. 11 is a comparison of an airfoil trail of a blade installed with a blade noise reduction device in accordance with an embodiment of the present invention.

FIG. 11 is a comparison of an airfoil wake of a blade installed with a blade noise reduction device in accordance with an embodiment of the present invention. As shown in FIG. 11, it can be seen that the trailing edge with the sawtooth structure of the present invention can widen the flow wake, accelerate the breaking of large vortices in the incoming flow, and is beneficial to noise reduction; Compared to a customary sawtooth, on the basis of widening the wake, it can achieve a smaller wake loss, which is more advantageous in terms of a noise reduction level and aerodynamic performance.

As described above, according to the embodiments of the present disclosure, by the secondary teeth formed on both sides of the primary tooth, the noise reduction effect can be improved.

According to the embodiment of the present disclosure, by making the addendum angle of the secondary teeth smaller than the addendum angle of the primary tooth, it can help to guide the eddy current in the air, achieve a better noise reduction effect, and at the same time, the rigidity of the primary tooth can be ensured.

According to the embodiment of the present disclosure, the noise reduction effect can be further improved by increasing the length of the secondary teeth, improving the curved surface design of the pressure surface of the sawtooth unit, and setting guide ribs, and the noise reduction effect is still significant at high wind speeds.

Although the embodiments of the present disclosure have been described above in detail, various modifications and variations can be made in the embodiments of the present disclosure by those skilled in the art without departing from the spirit and scope of the present disclosure. However, it should be understood by those skilled in the art that such modifications and variations will still fall within the gist and scope of the embodiments of the present disclosure as defined in claims. In addition, the various embodiments described above may be combined with each other without contradicting each other.

What is claimed is:

1. A blade noise reduction device, characterized in that the blade noise reduction device comprises:
    a plurality of sawtooth units arranged along a first direction, wherein each sawtooth unit comprises a primary tooth and secondary teeth extending along a second direction, and at least one secondary tooth is distributed on each of two sides of the primary tooth,
    wherein an addendum angle of the secondary tooth is smaller than an addendum angle of the primary tooth,
    the blade noise reduction device further comprises a connection body with a first side and a second side opposite to each other in the second direction, and the plurality of sawtooth units are disposed on the second side of the connection body,
    the connection body comprises a joint area and a trailing edge step, and the trailing edge step protrudes relative to the joint area on the suction surface of the blade noise reduction device and arranged at an end of the joint area close to the sawtooth unit, and
    the connection body further comprises an extension section arranged between the joint area and the sawtooth unit, and a thickness of the extension section is gradually decreased along the second direction.

2. The blade noise reduction device according to claim 1, characterized in that a ratio of a height H to a width W of the primary tooth satisfies 1≤H/W≤10, wherein the height H of the primary tooth is defined as a distance from a tooth tip of the primary tooth to a tooth root of the sawtooth unit, and the width W of the primary tooth is defined as a distance between two intersection points formed by two sides of the primary tooth and the tooth root.

3. The blade noise reduction device according to claim 1, characterized in that the addendum angle of the primary tooth is greater than or equal to 11.4° and less than or equal to 53.1°.

4. The blade noise reduction device according to claim 1, characterized in that at least two secondary teeth are distributed on each of two sides of the primary tooth, and along the second direction, a length of an outer side of each secondary tooth is gradually increased, and a length of an inner side of each secondary tooth is gradually increased.

5. The blade noise reduction device according to claim 1, characterized in that the blade noise reduction device comprises a suction surface and a pressure surface opposite to the suction surface, on the suction surface, the sawtooth unit is in a shape of a plane, and on the pressure surface, the sawtooth unit is in a shape of a continuous curved surface.

6. The blade noise reduction device according to claim 5, characterized in that a thickness of the primary tooth is gradually decreased from an axis of the primary tooth toward the two sides of the primary tooth, and a thickness of the secondary tooth is gradually decreased from an axis of the secondary tooth toward two sides of the secondary tooth.

7. The blade noise reduction device according to claim 1, characterized in that at least one secondary tooth extends in the second direction to a position aligned with a tooth tip of the primary tooth.

8. The blade noise reduction device according to claim 1, characterized in that the blade noise reduction device comprises a suction surface and a pressure surface opposite to the suction surface, and
    a plurality of guide ribs are provided on the pressure surface of the blade noise reduction device and extend from one side to the other side of the blade noise reduction device along the second direction.

9. The blade noise reduction device according to claim 8, characterized in that along the second direction, each guide rib comprises a leading edge transition section, a trailing edge transition section, and an equal-height section connecting the leading edge transition section and the trailing edge transition section, at the leading edge transition section, a height of the guide rib is increased from 0 mm to a predetermined height, and at the trailing edge transition section, a height of the guide rib is decreased from the predetermined height to 0 mm.

10. The blade noise reduction device according to claim 9, characterized in that a length of the leading edge transition section in the second direction is less than or equal to 20 mm, and a length of the trailing edge transition section in the second direction is less than or equal to 20 mm.

11. The blade noise reduction device according to claim 8, characterized in that in the first direction, the guide ribs are respectively provided at positions corresponding to a tooth tip of the primary tooth, tooth tips of the secondary teeth, and a position between adjacent sawtooth units.

12. The blade noise reduction device according to claim 11, characterized in that in the first direction, a guide rib is further provided at a position between the tooth tips of the secondary teeth, and a distance between adjacent guide ribs is between 2 mm-8 mm.

13. The blade noise reduction device according to claim 1, characterized in that a length of the joint area in the second direction is 50 mm-100 mm, and the suction surface of the joint area is provided as one of a smooth surface, a frosted surface and a surface with a groove or a combination thereof.

14. The blade noise reduction device according to claim 1, characterized in that a length of the extension section in the second direction is greater than 0 mm and less than or equal to 100 mm.

15. A blade, characterized in that the blade comprises the blade noise reduction device according to claim 1.

16. The blade according to claim 15, characterized in that in the second direction, a length of the blade noise reduction device protruding from a trailing edge of the blade is 10%-20% of a chord length of a cross-sectional airfoil of the blade at a position where the blade noise reduction device is installed.

17. The blade according to claim 15, characterized in that the blade noise reduction device is arranged in a range of 0%-40% of a length of the blade from a tip of the blade.

18. A wind power generator set, characterized in that the wind power generator set comprises the blade according to claim 15.

\* \* \* \* \*